United States Patent
Cox et al.

(10) Patent No.: US 7,740,807 B2
(45) Date of Patent: Jun. 22, 2010

(54) MICROFLUIDIC DEVICE INCLUDING DISPLACEABLE MATERIAL TRAP, AND SYSTEM

(75) Inventors: David M. Cox, Foster City, CA (US); Sean M. Desmond, San Carlos, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 0 days.

(21) Appl. No.: 12/251,006

(22) Filed: Oct. 14, 2008

(65) Prior Publication Data

US 2009/0032124 A1    Feb. 5, 2009

Related U.S. Application Data

(60) Division of application No. 10/808,228, filed on Mar. 24, 2004, now Pat. No. 7,452,509, which is a continuation-in-part of application No. 10/403,652, filed on Mar. 31, 2003, now Pat. No. 7,135,147, said application No. 10/808,228 is a continuation-in-part of application No. 10/336,706, filed on Jan. 3, 2003, now Pat. No. 7,214,348, said application No. 10/808,228 is a continuation-in-part of application No. 10/403,640, filed on Mar. 31, 2003, now Pat. No. 7,201,881, and a continuation-in-part of application No. 10/336,330, filed on Jan. 3, 2003, now Pat. No. 7,041,258, and a continuation-in-part of application No. 10/426,587, filed on Apr. 30, 2003, now Pat. No. 6,817,373.

(60) Provisional application No. 60/398,777, filed on Jul. 26, 2002, provisional application No. 60/399,548, filed on Jul. 30, 2002.

(51) Int. Cl.
B01L 3/00 (2006.01)

(52) U.S. Cl. ......................... 422/100; 137/67

(58) Field of Classification Search ................. 422/100; 137/67

See application file for complete search history.

(56) References Cited

U.S. PATENT DOCUMENTS

| | | | |
|---|---|---|---|
| 4,267,853 | A | 5/1981 | Yamaguchi et al. |
| 5,061,446 | A | 10/1991 | Guigan |
| 5,254,479 | A | 10/1993 | Chemelli |
| 5,256,376 | A | 10/1993 | Callan et al. |
| 5,642,640 | A | 7/1997 | Insalaco et al. |
| 5,863,801 | A | 1/1999 | Southgate et al. |
| 5,932,799 | A | 8/1999 | Moles |
| 6,068,751 | A | 5/2000 | Neukermans |
| 6,102,897 | A | 8/2000 | Lang |
| 6,143,248 | A | 11/2000 | Kellogg et al. |
| 6,379,929 | B1 | 4/2002 | Burns et al. |
| 6,390,791 | B1 | 5/2002 | Maillefer et al. |
| 6,408,878 | B2 | 6/2002 | Unger et al. |
| 6,431,212 | B1 | 8/2002 | Hayenga et al. |

(Continued)

OTHER PUBLICATIONS

International Search Report dated Aug. 24, 2006 from PCTUS05/09260.

(Continued)

*Primary Examiner*—Robert A Hopkins

(57) ABSTRACT

A microfluidic device is provided that can include an input liquid-containment feature. The microfluidic device can include an overflow channel in fluid communication with the input liquid-containment feature. The microfluidic device can include a fluid capture appendix in fluid communication with the overflow channel.

3 Claims, 9 Drawing Sheets

U.S. PATENT DOCUMENTS

| | | |
|---|---|---|
| 6,457,236 B1 | 10/2002 | White et al. |
| 6,527,003 B1 | 3/2003 | Webster |
| 6,575,188 B2 | 6/2003 | Parunak |
| 6,814,935 B2 | 11/2004 | Harms et al. |
| 6,919,058 B2 * | 7/2005 | Andersson et al. ............ 506/33 |
| 2001/0029983 A1 | 10/2001 | Unger et al. |
| 2001/0033796 A1 | 10/2001 | Unger et al. |
| 2002/0127149 A1 | 9/2002 | Dubrow et al. |
| 2002/0148992 A1 | 10/2002 | Hayenga et al. |
| 2002/0168278 A1 | 11/2002 | Jeon et al. |
| 2002/0187560 A1 | 12/2002 | Pezzuto et al. |
| 2002/0195579 A1 | 12/2002 | Johnson |
| 2004/0179972 A1 | 9/2004 | Karp et al. |
| 2007/0014695 A1 | 1/2007 | Yue et al. |

OTHER PUBLICATIONS

Notification concerning Transmittal of International Preliminary Report on Patentability dated Oct. 5, 2006, in connection with Application No. PCT/US2005/009260.

Written Opinion of the International Searching Authority dated Aug. 24, 2006, in connection with Application No. PCT/US2005/009260.

International Preliminary Report on Patentability dated Oct. 5, 2006, in connection with Application No. PCT/US2005/009260.

* cited by examiner

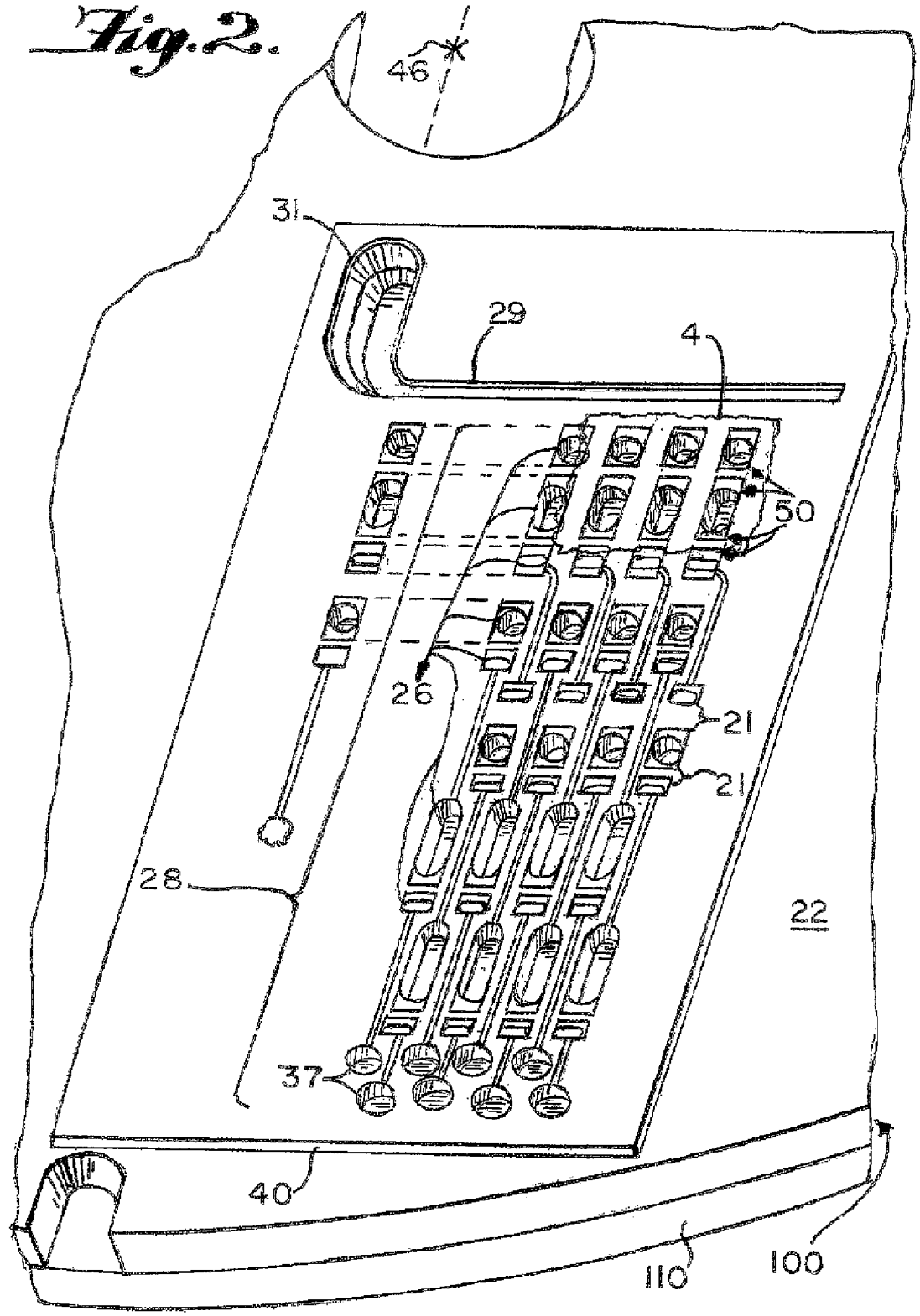

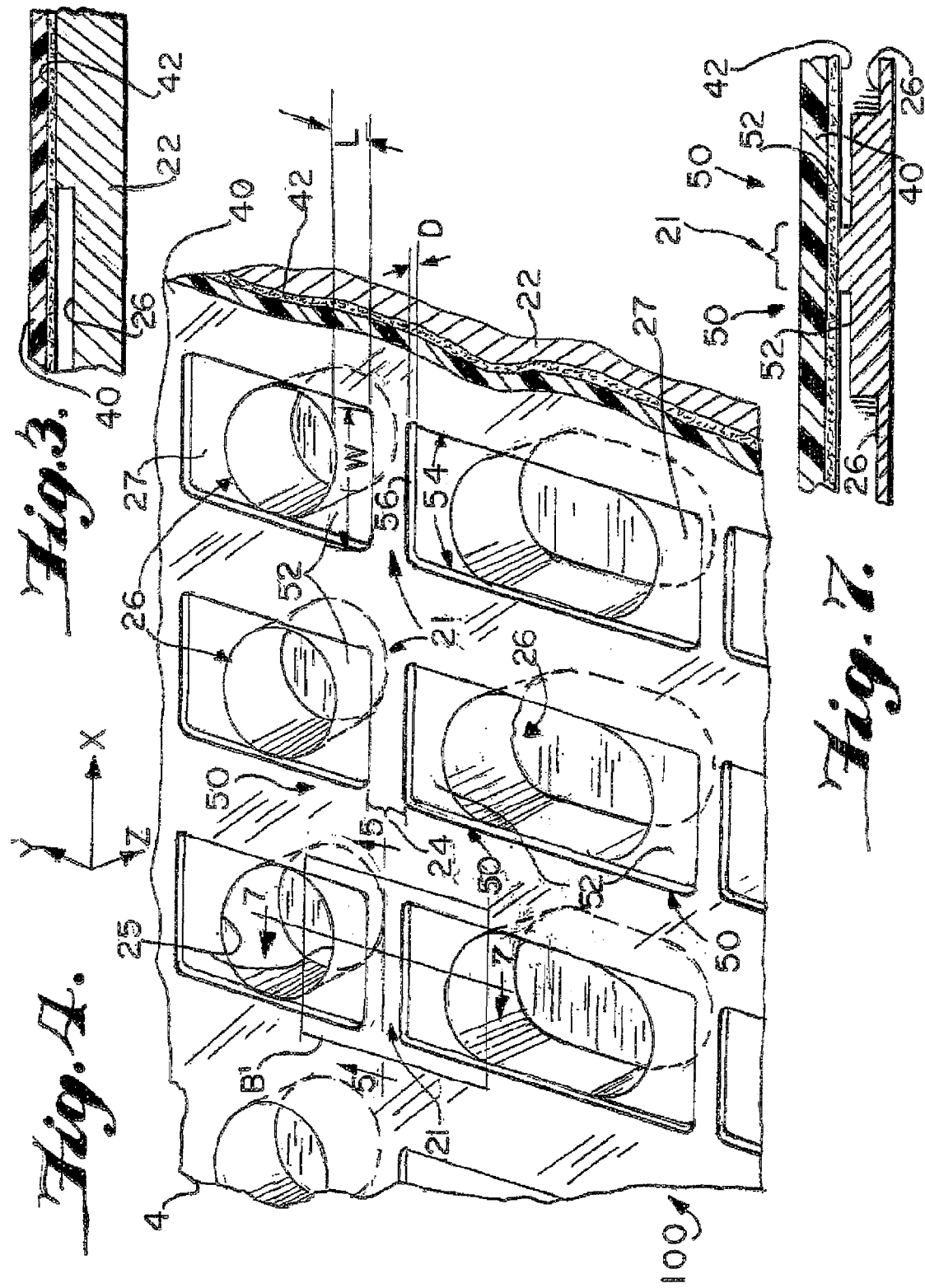

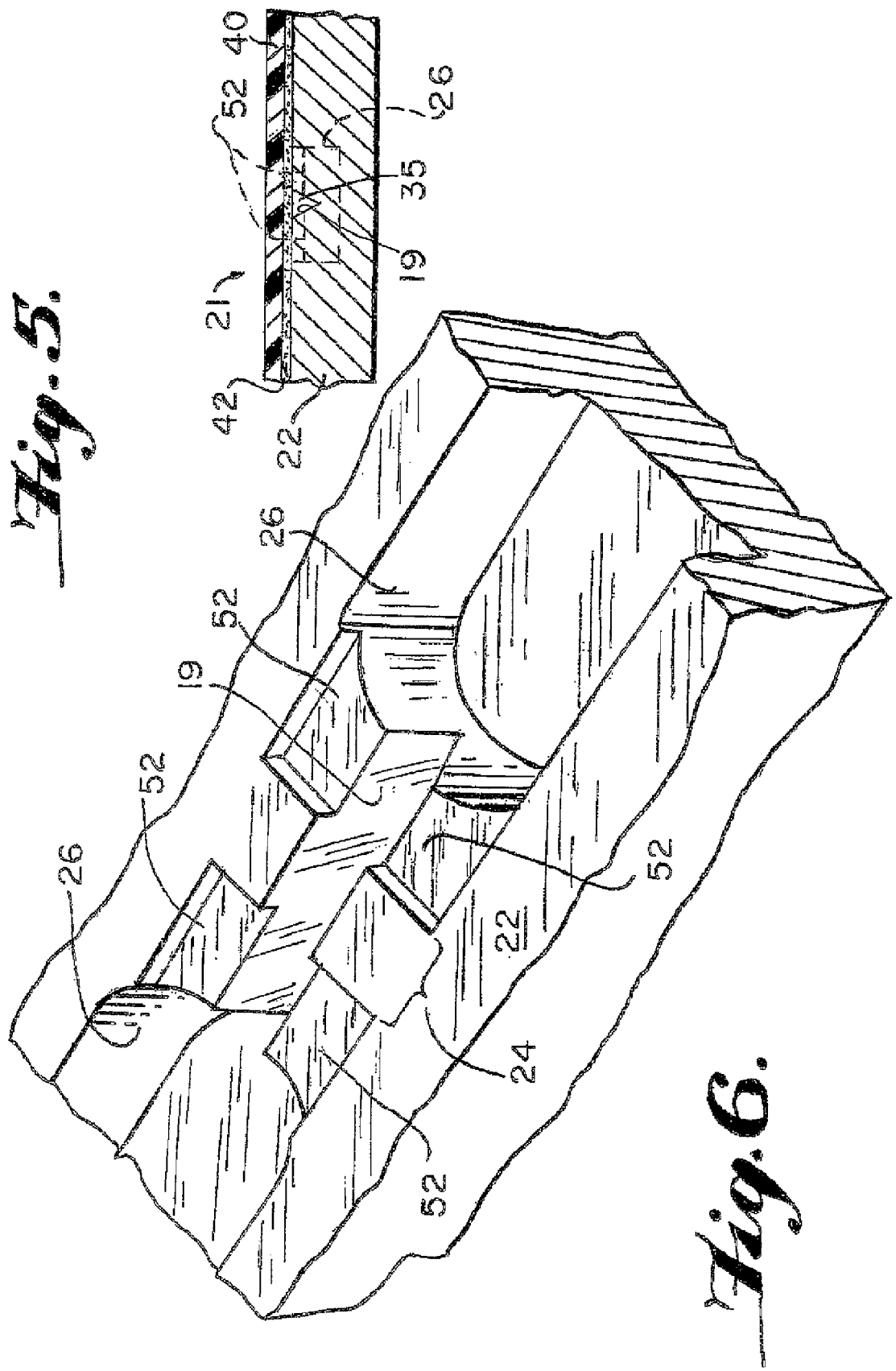

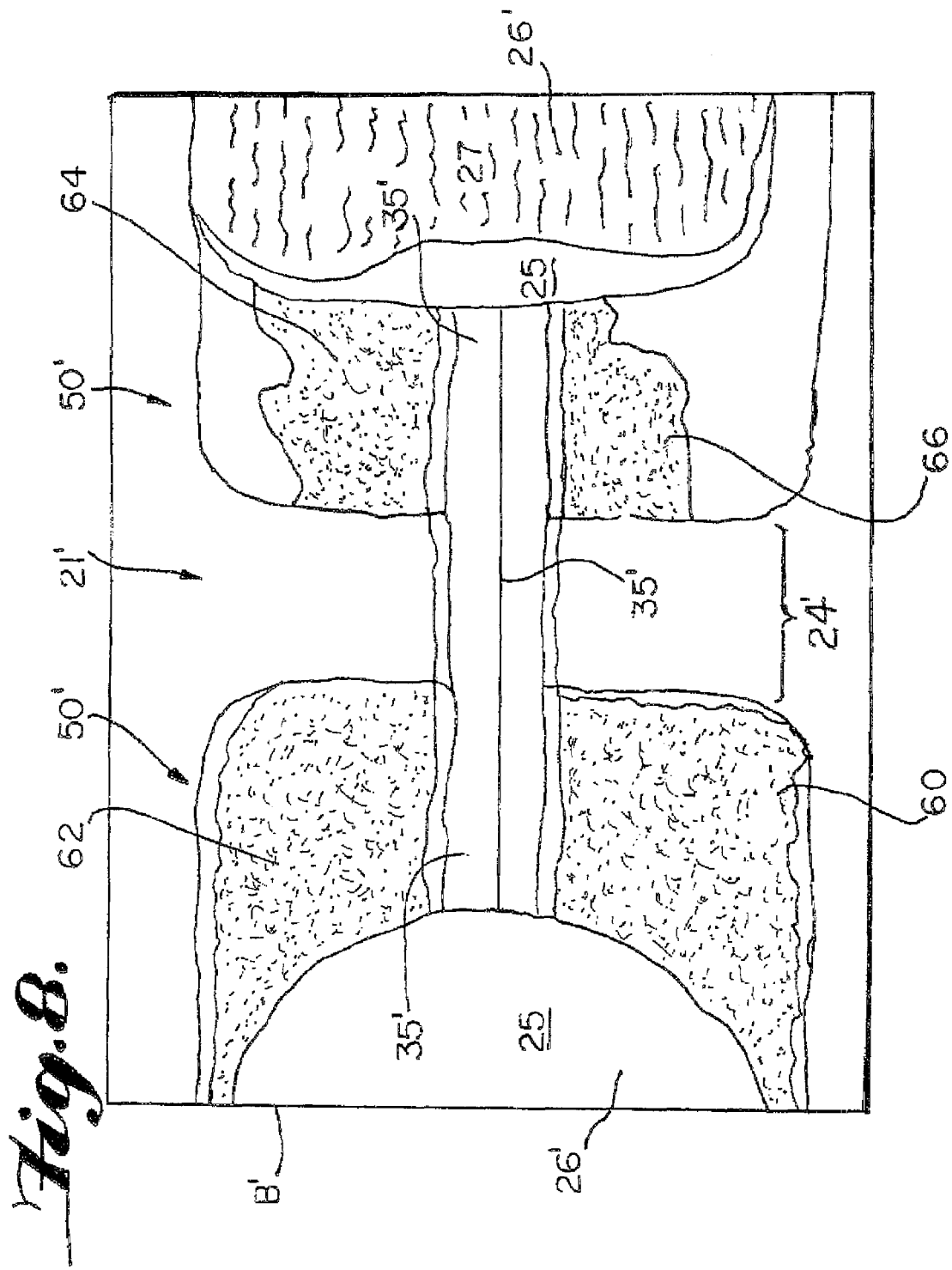

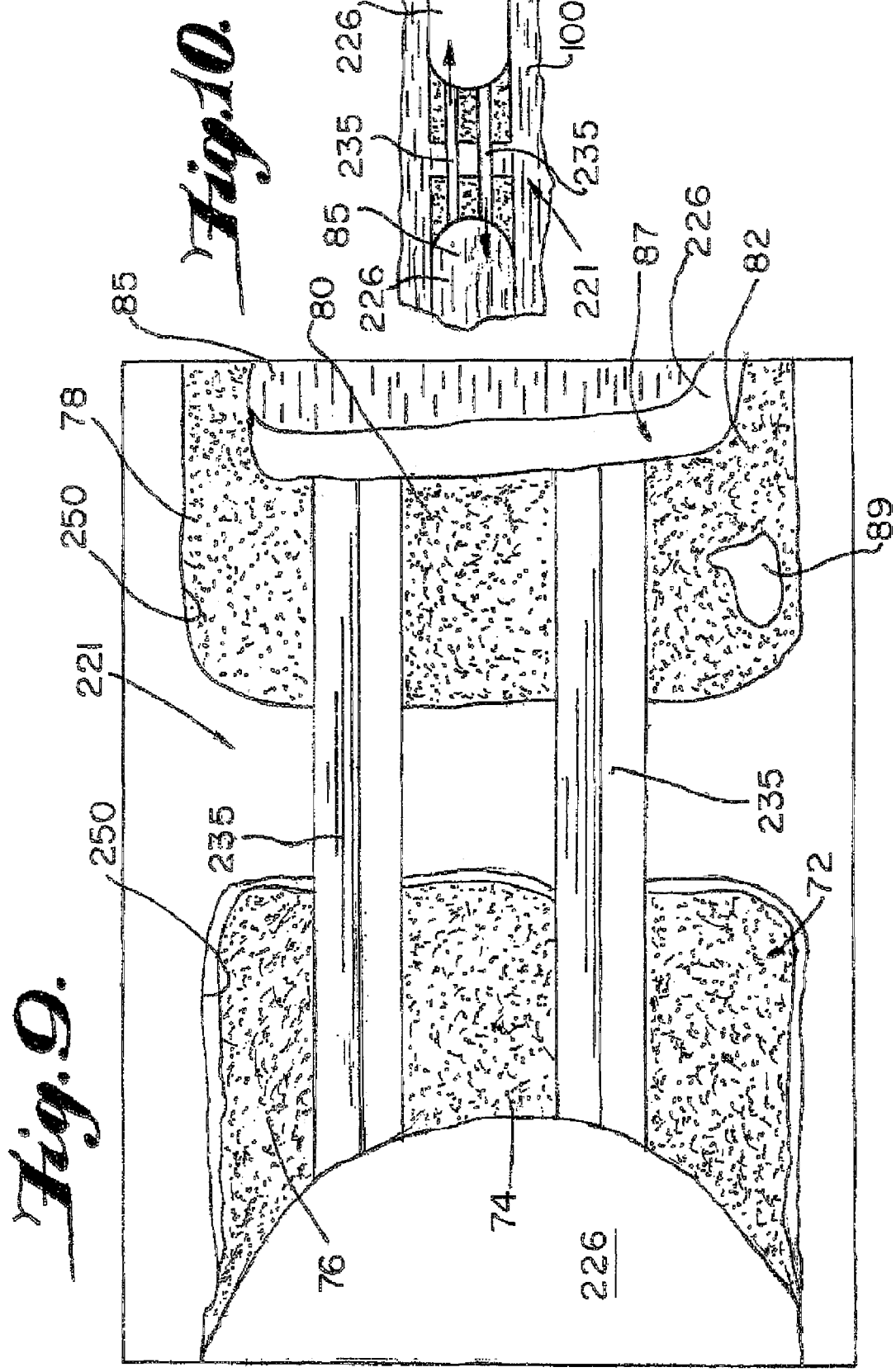

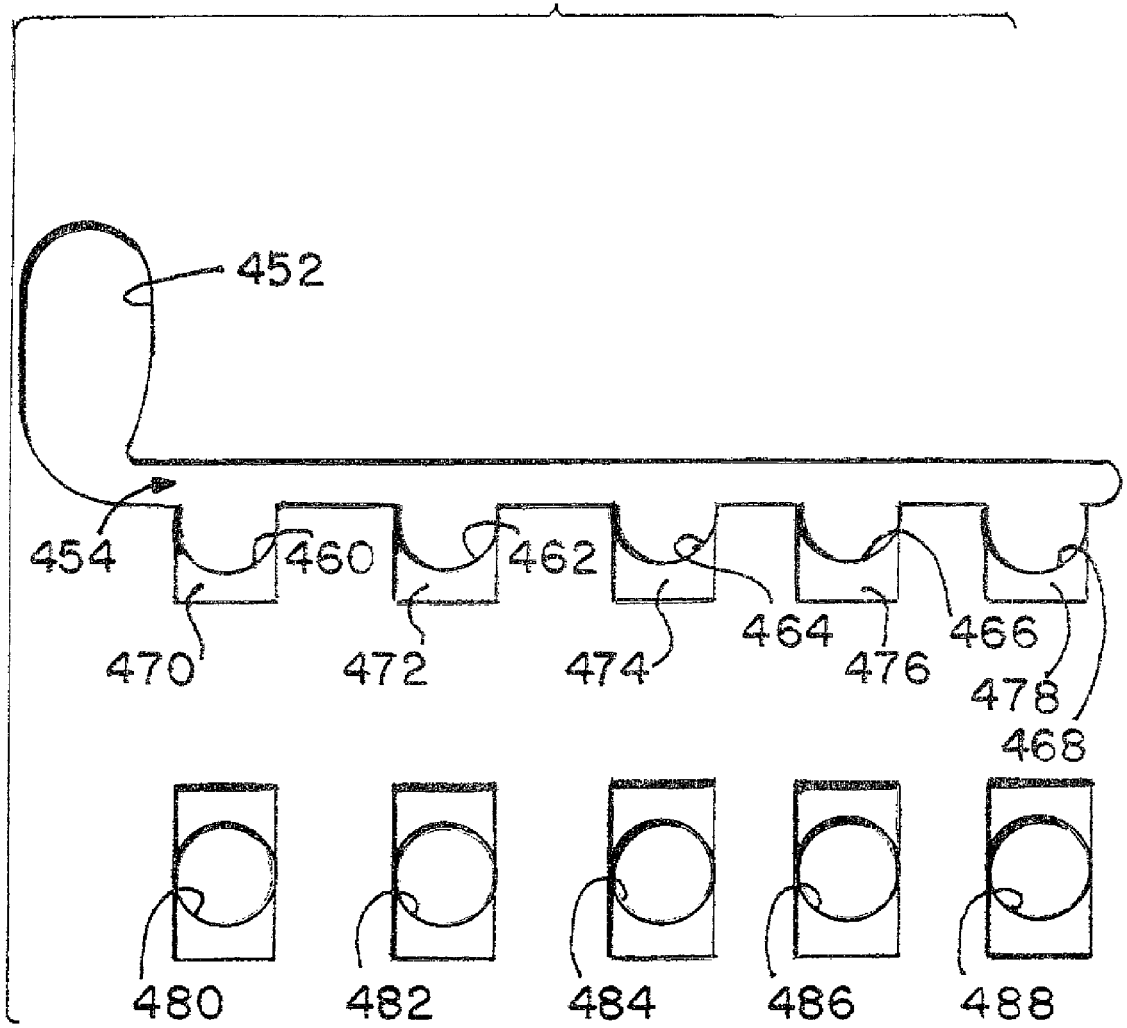

MICROFLUIDIC DEVICE INCLUDING DISPLACEABLE MATERIAL TRAP, AND SYSTEM

CROSS REFERENCE TO RELATED APPLICATIONS

This application is a divisional of U.S. patent application Ser. No. 10/808,228, filed Mar. 24, 2004, which is a continuation-in-part of U.S. patent application Ser. No. 10/403,652, filed Mar. 31, 2003, that claims the benefit of U.S. Provisional Application No. 60/398,777, filed Jul. 26, 2002; U.S. patent application Ser. No. 10/808,228 is a continuation-in-part of U.S. patent application Ser. No. 10/336,706, filed Jan. 3, 2003, that claims the benefit of U.S. Provisional Application No. 60/399,548, filed Jul. 30, 2002; U.S. patent application Ser. No. 10/808,228 is a continuation-in-part of U.S. patent application Ser. No. 10/403,640, filed Mar. 31, 2003; U.S. patent application Ser. No. 10/808,228 is a continuation-in-part of U.S. patent application Ser. No. 10/336,330, filed Jan. 3, 2003; and U.S. patent application Ser. No. 10/808,228 is a continuation-in-part of U.S. patent application Ser. No. 10/426,587, filed Apr. 30, 2003, all of which are incorporated herein in their entireties by reference.

FIELD

The present teachings relate to fluid handling assemblies, systems, and devices, and methods for using such assemblies, systems, and devices. The present teachings relate to microfluidic fluid handling assemblies, systems, and devices, and methods that allow for the manipulation, processing, and other handling of micro-sized amounts of fluids and fluid samples.

BACKGROUND

Microfluidic devices can be useful for manipulating micro-sized fluids. There continues to exist a need for valve assemblies for use in microfluidic devices that enable controlled fluid flow through a microfluidic device. In particular, a need exists for reliable, efficient, and easily actuable valve assemblies that can promote the processing of micro-sized fluids through microfluidic devices.

SUMMARY

According to various embodiments, the present teachings provide a device that can include a first liquid-containment feature, a second liquid-containment feature, and a valve, including a trap, that can separate the first liquid-containment feature from the second liquid-containment feature. The valve can be capable of selectively controlling a fluid communication between the first liquid-containment feature and the second liquid-containment feature. The valve can include a substrate and a cover layer, and the cover layer can be attached to the substrate by way of a displaceable adhesion material. The trap can be arranged adjacent the valve and the trap can be capable of receiving a portion of the displaceable adhesion material that can be displaced upon opening the valve.

According to various embodiments, the present teachings provide a system that includes a microfluidic device including liquid-containment features as described above, wherein the system further includes a platen providing at least one holder for holding the microfluidic device. The system can include a first deformer and a drive unit for driving the first deformer toward the microfluidic device to apply a deforming force to the cover sheet and the substrate. Upon deformation, the trap can receive displaced adhesion material from the displaceable adhesion material layer.

The present teachings provide a method of actuating a valve including a trap arranged adjacent the deformable valve. The method can include providing a deformable valve capable of selectively controlling fluid communication between a first liquid-containment feature and a second liquid-containment feature. The deformable valve can include a substrate and a cover layer attached to the substrate by a displaceable adhesion material layer disposed between the substrate and cover layer. The method can include forcing the cover layer into deformable contact with the substrate by moving the deformer and actuating the deformable valve. The method can include collecting a displaced adhesion material in the trap.

Additional features and advantages of the various embodiments described herein will be set forth in part in the description and drawings that follow, and in part will be apparent from the description and drawings, or may be learned by practice of various embodiments.

BRIEF DESCRIPTION OF THE DRAWINGS

FIG. 2 is an enlarged, perspective view of a microfluidic device according to various embodiments;

FIG. 3 is a cross-section through an arbitrary thickness of the microfluidic device of FIG. 2 according to various embodiments;

FIG. 4 is an enlarged, perspective view of region 4 of the microfluidic device of FIG. 2;

FIG. 5 is a cross-sectional end view of a deformable valve taken through line 5-5 of FIG. 4, according to various embodiments, and after a deformer has formed a fluid communication between the liquid-containment features shown;

FIG. 6 is an enlarged, perspective view of a depression formed in a substrate of a microfluidic device, after deformation caused by an opening deformer used according to various embodiments;

FIG. 7 is a cross-sectional side view of a deformable valve and two traps adjacent the valve, and taken through line 7-7 of FIG. 4;

FIG. 8 is a top-plan view of region B' of FIG. 4, showing a fluid communication between two liquid-containment features and a deformation caused by an opening deformer;

FIG. 9 is a top-plan view of region B' of FIG. 4, showing a fluid communication between two liquid-containment features and two deformations formed by one or more opening deformers;

FIG. 10 is a schematic of the top-plan view shown in FIG. 9;

FIG. 14 is a top-plan view of a section of a microfluidic device that includes a flow distribution manifold in fluid communication with an input liquid-containment feature.

DESCRIPTION

It is to be understood that both the foregoing general description and the following detailed description are exemplary and explanatory only, and are intended to provide an explanation of various embodiments of the present teachings.

According to various embodiments, a device for manipulating fluid movement can be provided that includes a valve and trap useful for collecting an adhesion material, for example, glue, adhesive, and/or a sealing material, that is displaced during a valve-opening procedure. The device for manipulating fluid movement can be, for example, a microfluidic device or a card-type fluid handing device. The device can include a deformable valve situated within or within the vicinity of a passageway of the microfluidic device and between two liquid-containment features. The deformable valve can be actuated to control fluid flow between microfluidic liquid-containment features formed in or on the microfluidic device. One or more deformable valves can be used to manipulate fluid movement in and through the microfluidic device. Traps can be used to catch and trap a displaced material, for example, a glue, an adhesive, a sealing material, and the like, displaced during actuation or deformation, for example, during opening or closing, of the one or more deformable valves. Methods for manipulating fluids by using microfluidic devices as described herein, can be exemplified with reference to the drawings.

Figure 1:
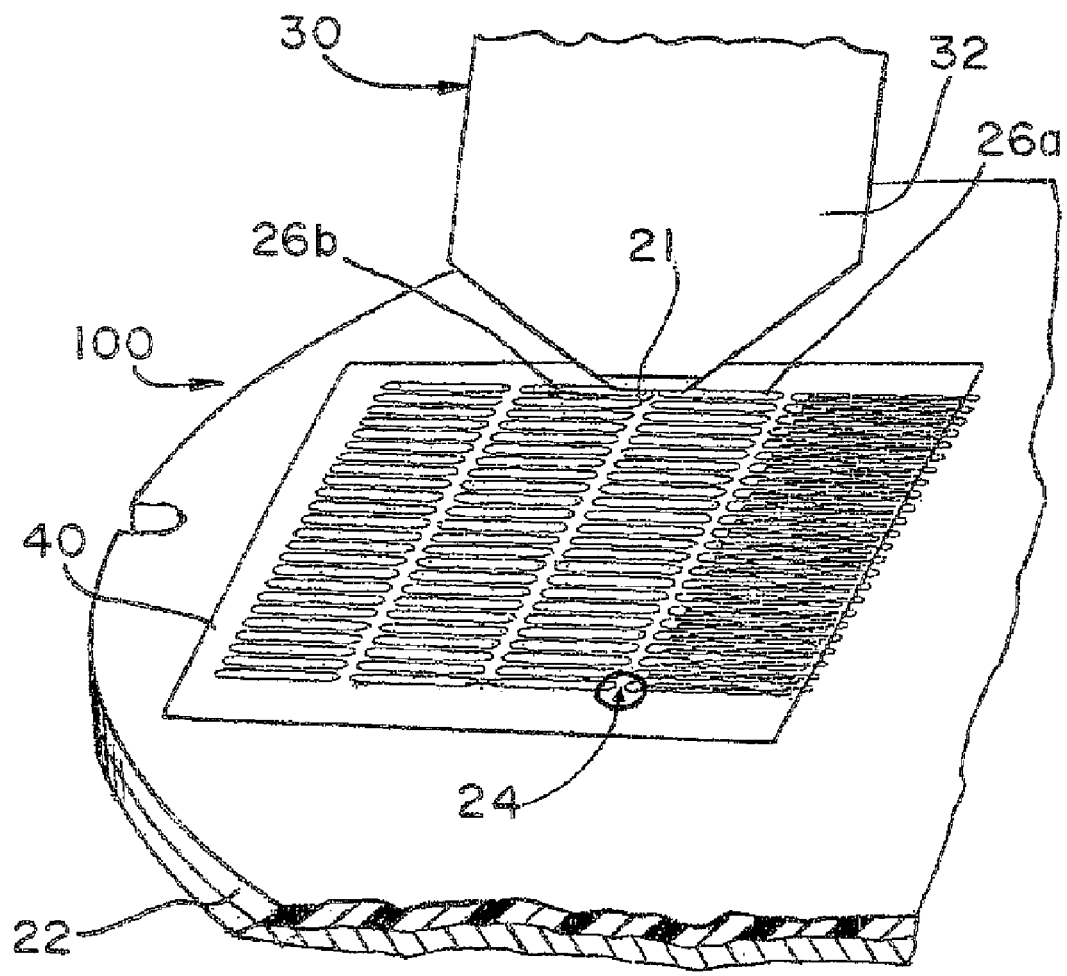
FIG. 1 is a perspective view of a microfluidic device being deformed by an external valve-deforming device according to various embodiments.

FIG. 1 is a perspective view of a system that includes a microfluidic device 100 having a deformable valve 21. The deformable valve 21 can be deformed by a valve-deforming device or deformer 30. The valve-deforming device 30 can include a deformer blade 32. The deformer blade 32 can include a sharp edge (as shown) for forming a fluid communication, or can include a blunt tip including a compliant pad (not shown) for closing the valve. According to various embodiments, the compliant pad can include or be in thermal contact with a heat source. The deformer blade 32 can be forced into contact with a cover sheet 40 of the microfluidic device 100 in an area situated between two liquid-containment features, for example, between liquid wells 26a and 26b, formed in a substrate 22 of the microfluidic device 100. The cover sheet 40 can be formed of an elastically deformable material. The deformer blade 32 can be forced into contact with the cover sheet 40 at a force that can be capable of deforming the cover sheet 40 and deforming a portion of the underlying substrate 22, to thereby open the deformable valve 21. When the deformer blade includes a blunt tip, the deformer blade can be forced into contact with the cover sheet 40 at a force that can be capable of deforming a displaceable adhesion material to close an otherwise open fluid communication between two liquid-containment features. A portion of the substrate 22, including an intermediate wall 24, and a portion of cover sheet 40, can together form or at least partially define the deformable valve 21. In a non-deformed state of the deformable valve 21, adjacent liquid-containment features of the microfluidic device 100, for example, liquid wells 26a, 26b, can be fluidically separated. By deforming one or more deformable valves 21 of the microfluidic device 100, adjacent liquid-containment features can be selectively placed into or out of fluid communication with one another. Such deformable valves 21 can be or include Zbig valves as described in U.S. patent applications Ser. Nos. 10/336,274, and 10/625,449, which are incorporated herein in their entireties by reference.

Greater details with regard to the structure and operation of deformable valves, the components of microfluidic devices, and the manipulation of fluids through microfluidic devices, are described in U.S. Provisional Patent Applications Nos. 60/398,851, filed Jul. 26, 2002, 60/399,548, filed Jul. 30, 2002, and 60/398,777 filed Jul. 26, 2002, and in U.S. patent applications Ser. Nos. 10/336,274, 10/336,706, and 10/336,330, all three of which were filed on Jan. 3, 2003, and in U.S. patent application Ser. No. 10/403,652, filed Mar. 31, 2003. All of these provisional patent applications and non-provisional patent applications are incorporated herein in their entireties by reference.

FIG. 2 is an enlarged, perspective view of a microfluidic device 100 according to various embodiments that can be used to manipulate fluids, for example, micro-sized fluids and fluid samples. Herein, micro-sized fluids refers to liquid volumes of about one milliliter (ml) or less. The microfluidic device 100 can include a substrate 22 that can include a plurality of liquid-containment features formed therein or thereon, for example, a plurality of wells. The liquid-containment features 26 can be included in or on the microfluidic device 100. Other liquid-containment features, for example, reservoirs, recesses, channels, vias, appendices, input wells and ports, output wells, purification columns, valves, and combinations thereof can be interconnected by deformable valves, and can be included in or on the microfluidic device 100 according to various embodiments. As shown in FIG. 2, the deformable valves 21, such as Zbig valves, can be arranged between the liquid-containment features 26 to selectively control fluid communication between the liquid-containment features 26.

According to various embodiments, the substrate 22 of the microfluidic device 100 can be at least partially formed of a deformable material, for example, an inelastically deformable material. The substrate 22 can include a single layer of material, a coated layer of material, a multi-layered composite or structure, or a combination thereof. The substrate 22 can be formed as a single layer and made of a non-brittle plastic material, for example, polycarbonate, or a cyclic olefin copolymer material such as that available as from TOPAS from Ticona (Celanese AG), Summit, N.J., USA. The substrate 22 can be in the shape of a disk, a rectangle, a square, or any other shape.

According to various embodiments, an elastically deformable cover sheet 40 can be adhered to at least one of the surfaces of the substrate 22. The cover sheet 40 can be made of, for example, a plastic, an elastomer, or another elastically deformable material. According to various embodiments, the cover sheet 40 can be coated, for example, with a pressure sensitive adhesive. The microfluidic device 100 can include a central axis of rotation 46. An input liquid-containment feature 31 can be fluidly connected to a manifold 29 to distribute a liquid to a plurality of pathways 28 via a plurality of branch channels (not shown) that can be operably formed in the substrate 22. For example, one or more fluids can be introduced by piercing through the cover sheet 40 in the area of the input liquid-containment feature 31 and injecting the one or more fluids into the input liquid-containment feature 31. Branch channels can then be formed, for example, by deformation, in the substrate and between the manifold 29 and a first row of liquid-containment features 26. The distributed fluid portions can then be processed through respective pathways 28 and collected in respective output wells 37. An enlarged view of a region 4 of the microfluidic device 100 can be found in FIG. 4.

According to various embodiments, and as shown in FIG. 2, various liquid-containment features 26 can be formed in or on the substrate 22 of the microfluidic device 100. For example, a plurality of pathways of liquid-containment features 26 can be arranged generally linearly in series on the substrate 22. According to various embodiments, a trap 50 can be disposed adjacent, or in the vicinity of, one or more liquid-containment feature 26, for example, in the vicinity of the entrance to or exit from the feature.

According to various embodiments, each series of liquid-containment features 26, along with the elastically deformable cover sheet 40, can be arranged to define a liquid processing pathway 28. An input liquid-containment feature 31 can be used for the introduction of one or more fluids into an input chamber or manifold 29. According to various embodiments, and as shown in FIG. 2, more than one liquid processing pathway 28 can be arranged side-by-side (as shown) or radially (not shown) in or on the substrate 22, A plurality of fluids or a plurality of portions of the same fluid can be processed in the liquid processing pathways 28. The processing can occur serially or simultaneously. For example, 12, 24, 48, 96, 192, 384, or more liquid processing pathways 28 can be arranged side-by-side to form a set of liquid processing pathways on a single microfluidic device 100. Moreover, two or more sets of liquid processing pathways can be arranged on a single microfluidic device 100. One or more output wells or chambers 37 can be provided for each liquid processing pathway 28, and each pathway can include one or more flow splitters.

According to various embodiments, the microfluidic device 100 can be rotated through a central axis of rotation 46, to selectively force fluids between the liquid-containment features of the microfluidic device 100, by way of centripetal force. For example, by spinning the microfluidic device 100 around the central axis of rotation 46, a fluid can be selectively forced to move from at least the input chamber or manifold 29 to the output chamber or well 37, along a liquid processing pathway 28. According to various embodiments, a platen and/or a holder 110 can be arranged to support and rotate a microfluidic device 100 about an axis of rotation of the platen and/or holder 110. According to various embodiments and as shown in FIG. 2, the axis of rotation of the platen and/or holder 110 can be coaxial with the central axis of rotation 46 of the microfluidic device 100.

FIG. 3 shows a cross-section through an arbitrary thickness of the microfluidic device 100 of FIG. 2, and shows the elastically deformable cover sheet 40 that can be adhered to a surface of the substrate 22, for example, with a layer 42 of displaceable adhesion material. An exemplary liquid-containment feature 26 is shown and can be defined by the substrate 22 and the cover sheet 40. According to various embodiments, the layer 42 of displaceable adhesion material can be formed as part of the cover sheet 40. The displaceable adhesion material can be a soft material, for example, a hot melt adhesive or pressure sensitive adhesive that can be formed on the cover sheet 40.

According to various embodiments, the displaceable adhesion material can hold and/or seal, two surfaces or layers together. The displaceable adhesion material can be a soft material, such as a plastic, for example, that can adhere the cover layer to the substrate. The displaceable adhesion material can become soft at an elevated temperature, for example, such as a hot melt adhesive. Exemplary displaceable adhesion materials can include resins, glues, adhesives, epoxies, silicones, urethanes, waxes, polymers, isocyanates, pressure sensitive adhesives, hot melt adhesives, and combinations thereof, and the like. The displaceable adhesion material can be a silicone-based adhesive, disposed on a cover, for example, a polyolefin cover tape, available from 3M, 3M Center, St. Paul, Minn., USA.

FIG. 4 shows an enlarged, perspective view of region 4 of the microfluidic device 100 of FIG. 2. Each deformable valve can include an intermediate wall 24 shown in FIG. 4 in a non-deformed state. One or more traps 50 can be provided adjacent each respective deformable valve 21. At least one deformable valve 21 and one or more traps 50 can be located between adjacent liquid-containment features 26 along a processing pathway 28. As discussed with respect to FIG. 1, the deformable valve 21 can be forcibly deformed with one or more deformers, for example, with an opening blade or a closing blade, to selectively open or close (respectively) a fluid communication between the liquid-containment features 26.

According to various embodiments, a microfluidic deforming mechanism (not shown), assembly, and/or system for deforming the microfluidic device 100 can be provided and/or operated as described, for example, in U.S. patent application Ser. No. 10/403,652 filed Mar. 31, 2003, which is incorporated herein in its entirety by reference. As described in U.S. patent application Ser. No. 10/403,652, fluids can be processed and moved from one liquid-containment feature 26 to an adjacent liquid-containment feature 26 along a respective liquid processing pathway 28, by operation of one or more microfluidic deforming mechanisms.

According to various embodiments, the trap 50 can include a recess 52 formed in a surface of the substrate 22. According to various embodiments, the dimensions of the recess 52, for example, a width, length, and depth, can be defined with reference to the X, Y, and Z coordinate system as shown in FIG. 4. According to various embodiments, an exemplary recess 52 can have a width W of about 1.20 mm, a length L of about 0.50 mm, and a depth D of from about 0.060 mm to about 0.080 mm.

According to various embodiments, the width, W, of each recess 52, as measured along the X-axis shown, can be from about 0.1 mm to about 3.0 mm, or from about 0.25 mm to about 1.75 mm. According to various embodiments, the width, W, of each recess 52 can be greater than about 3.0 mm. As shown in FIG. 4, the recess 52 can have substantially the same width as the widest dimension of a liquid-containment feature 26. The recess 52 can include a sidewall 54 defining its width. The sidewall 54 can be planar or include a planar portion. According to various embodiments and as shown in FIG. 4, one sidewall 54 of the recess 52 can extend substantially parallel to another sidewall 54 of the recess. The recess 52 can have a substantially constant width.

According to various embodiments, the length L of the recess 52, as measured along the Y-axis shown, can be as long as desired, for example, from about 0.1 mm to about 50 mm, or from about 1.0 mm to about 10 mm. The length of the recess 52 can be measured as the distance between the closest point on the rim 25 of the liquid-containment feature 26, to the nearest intermediate wall 24 of the adjacent deformable valve. According to various embodiments, a sidewall 56 of the recess 52 can be arranged opposite the rim 25. The sidewall 56 can be planar or can include a planar portion.

According to various embodiments, the depth D of the trap 50, as measured along the Z-axis shown, can be deep enough to allow a displaceable adhesion material 42 to flow into the recess 52 and become happed therein. The depth can be deep enough that the bottom of the recess can be spaced from the displaceable adhesion material 42 when the cover sheet 40 is assembled on the microfluidic device 100. As such, in an original and non-deformed state, the cover sheet 40 does not adhere to the bottom 27 of the recess 52.

According to various embodiments, the depth of the recess 52 can vary with the thickness of the displaceable adhesion material 42. For example, the recess 52 can have a depth of from about 0.01 mm to about 1.0 mm, for example, from about 0.025 mm to about 0.075 mm. According to various embodiments, the recess 52 can be formed as a step having a uniform-depth, or can be a depression including any shape or depth. The bottom 27 of the recess 52 can include a planar or curved surface.

FIG. 5 shows a cross-sectional end view of a deformable valve 21 through line 5-5 of FIG. 4, after a deformer has formed a fluid communication between two adjacent liquid-containment features 26. FIG. 5 shows the deformable valve 21 in an open state, including a fluid communication 35, that can extend between liquid-containment features 26. The fluid communication 35 can be created by manipulating the deformable valve 21, for example, with an opening deformer or opening blade (not shown). The deformable valve 21 can be manipulated to form the fluid communication 35. The deformer can include a movable support (not shown) that can move, for example, to contact a tip portion of an opening deformer or closing deformer against the microfluidic device 100. For example, the opening deformer can contact an elastically deformable cover sheet 40 in an area in and around an intermediate wall (not shown) of the deformable valve 21. The opening deformer can force the elastically deformable cover sheet 40 into the substrate 22. The opening deformer can be forced into the substrate 22 and can displace adhesive, from the displaceable adhesive layer 42, into the recess 52. The displaceable adhesive layer can be displaced away from an area above and adjacent the intermediate wall 24 to form a cross-sectional V-shaped depression 19.

FIG. 6 illustrates an enlarged, perspective view of the depression 19 that can be formed in the intermediate wall 24 of a substrate 22 by an opening deformer. The cover sheet 40 and displaceable adhesion material 42 shown in FIG. 5 are not shown in FIG. 6 for the sake of greater clarity. The depression 19 can extend between adjacent liquid-containment features 26, along the entire length of the intermediate wall 24, and into the portion of the substrate 22 defining the bottom of recess 52. The depression 19 can exhibit cross-sectional shapes complimentary to the shape of the opening deformer. The opening deformer shape can include a distil tip that includes, for example, a straight edge, a chisel-edge, or a pointed-blade, to form the depression 19 in the substrate 22. An exemplary opening deformer can have a chisel-edge that can be rounded to blunt its edge. For example, the chisel-edge deformer can have about a 0.005 inch radius, or from about a 0.001 inch radius to about 0.020 inch radius. According to various embodiments, the shape of the opening deformer, and the force applied to the microfluidic device 100 by the opening blade, can be designed, programmed, and/or implemented to prevent rupturing, cutting, ripping, or tearing, of the cover sheet.

According to various embodiments, during an opening operation of the deformable valve 21, the elastically deformable cover sheet 40 can rebound, at least partially, back to an initial, substantially planar, orientation. At the same time, the deformable material of the substrate 22, if less elastic than the cover sheet 40, can remain deformed, or at least for a longer period of time than the cover sheet. As a result of the different rebounding or elastic properties of the cover sheet and substrate, a fluid communication 35 can be formed between the two. The fluid communication 35 can be defined, at least in-part, by the cover sheet 40 and the depression 19. The fluid communication 35 formed by the opening deformer can extend between, and fluidically interconnect, adjacent liquid-containment features 26. The deformer can deform the intermediate wall 24 and form thru-channels of various depths.

The depth of the depression 19 can be less than, greater than, or equal to the depth of the trap recess 52. The depth of the depression 19 can control a flow rate of a liquid moving, or to be moved, from one liquid-containment feature to an adjacent liquid-containment feature. According to various embodiments, the recess 52 can trap deformed material of the substrate 52.

FIG. 7 is a cross-sectional side view of the microfluidic device 100 shown in FIG. 4, taken through line 7-7 of FIG. 4. The trap 50 shown can be, for example, arranged adjacent to, and on either side of, a deformable valve 21. According to various embodiments, the trap 50 can be defined partially by the cover layer 40, the displaceable adhesion material layer 42, and the recess 52 formed in the substrate 22.

According to various embodiments, two traps having similar depths can be used in combination with an opening blade. According to various embodiments, a deformable valve can include an intermediate wall arranged adjacent-opposite traps, wherein a deforming blade, for example, the deformer blade 32 shown in FIG. 1, can be forced into the deformable valve at least across the intermediate wall. The dimension or width of the intermediate walls between the adjacent-opposite traps can vary, for example, from about 0.1 mm to about 3 mm, from about 0.4 mm to about 1.0 mm. A trap in the adjacent-opposite traps can have a depth of, for example, from about 0.010 mm to about 0.20 mm, from about 0.40 mm to about 0.100 mm. A tip of the deforming blade can be about 3 mm wide. According to various embodiments, a deformer blade or an opening blade with a 3 mm tip can be used with intermediate walls having a width of from about 0.3 mm to about 2 mm, from about 0.4 mm to about 1 mm. According to various embodiments, a deformable valve including an intermediate wall having a width of about 1 mm can be manipulated more than once using a deformer blade that can apply a force across the intermediate wall of from about 13 lbs to about 30 lbs.

According to various embodiments, a deformable valve including an intermediate wall having a width of about 1 mm and adjacent-opposite traps having a depth of 0.100 mm can be manipulated using a deformer blade that can apply a force across the intermediate wall of from about 20 pounds (lbs) to about 32 lbs, from about 27 lbs to about 32 lbs. A deformable valve including an intermediate wall having a width of about 1 mm and adjacent-opposite traps having a depth of 0.080 mm can be manipulated using a deformer blade that can apply a force across the intermediate wall of from about 17 lbs to about 32 lbs, from about 23 lbs to about 30 lbs. A deformable valve including an intermediate wall having a width of about 1 mm and adjacent-opposite traps having a depth of 0.060 mm can be manipulated using a deformer blade that can apply a force across the intermediate wall of from about 15 lbs to about 32 lbs, from about 20 lbs to about 27 lbs. A deformable valve including an intermediate wall having a width of about 1 mm and adjacent-opposite traps having a depth of 0.040 mm can be manipulated using a deformer blade that can apply a force across the intermediate wall of from about 13 lbs to about 30 lbs, from about 17 lbs to about 25 lbs.

According to various embodiments, a deformable valve including an intermediate wall having a width of about 0.4 mm and adjacent-opposite traps having a depth of 0.100 mm can be manipulated using a deformer blade that can apply a force across the intermediate wall of from about 13 lbs to about 32 lbs, from about 17 lbs to about 27 lbs. A deformable valve including an intermediate wall having a width of about 0.4 mm and adjacent-opposite traps having a depth of 0.080 mm can be manipulated using a deformer blade that can apply a force across the intermediate wall of from about 11 lbs to about 32 lbs, from about 15 lbs to about 25 lbs. A deformable valve including an intermediate wall having a width of about 0.4 mm and adjacent-opposite traps having a depth of 0.060 mm can be manipulated using a deformer blade that can apply a force across the intermediate wall of from about 11 lbs to about 30 lbs, from about 13 lbs to about 23 lbs. A deformable valve including an intermediate wall having a width of about 0.4 mm and adjacent-opposite traps having a depth of 0.040 mm can be manipulated using a deformer blade that can apply a force across the intermediate wall of from about 7 lbs to about 25 lbs, from about 11 lbs to about 20 lbs.

FIG. 8 is a top plan view of a microfluidic device including a fluid communication 35' between two liquid-containment features 26', 26'. The microfluidic device can include an adhesive layer and a cover sheet, but for the sake of greater clarity an adhesive layer and a cover sheet are not shown in FIG. 8. The fluid communication 35' can result from an operation that includes contacting an opening deformer (not shown) with a deformable valve 21'. The opening deformer (not shown) can press against a cover sheet (not shown) and can deform the underlying deformable valve 21'. During such an operation, the opening deformer can deform and/or compress a displaceable adhesive layer, and deform the intermediate wall 24' of the deformable valve 21'. Two traps 50', 50', can be provided, one adjacent each liquid-containment feature 26', 26'. The fluid communication 35' can provide a fluid communication between the two liquid-containment features 26', 26'.

As shown in FIG. 8, the fluid communication opening 35' can extend through the deformable valve 21' and the traps 50', 50'. The displaceable adhesion material and/or a deformable portion of the deformable valve 21' can be displaced by an opening operation and trapped in one or both of the two traps 50', 50'. The displaced adhesion material is represented by reference numerals 60, 62, 64, and 66 in FIG. 8. During a manipulation of the deformable valve 21', for example, during an opening operation of the deformable valve 21', the two traps 50', 50' can provide a volume for the displaced adhesion material 60, 62, 64, and 66 to flow into. Substantially all of the displaceable adhesion material can be displaced from the vicinity of the fluid communication 35'. Minor and/or inconsequential amounts of the displaceable adhesion material can remain in the fluid communication 35', or flow into the two liquid wells 26', without deleteriously affecting a reaction in either of the liquid-containment features.

The fluid communication 35' can be defined by irregular surfaces. A majority of the displaceable adhesion material can be prevented from flowing into the fluid communication 35' or into either of the liquid-containment features 26'. After a fluid communication in an open state is provided, liquid 27 can be transferred from one liquid-containment feature 26' to an adjacent liquid-containment feature. Air 25 can be disposed in or remain in the liquid-containment features 26' before and/or after liquid 27 is transferred between such features.

According to various embodiments, by directing the displaceable adhesion material away from the fluid communication opening 35' and the liquid-containment features 26', and into the traps 50', the displaceable adhesion material can be prevented from fully or partially plugging the deformable valve 21', or the fluid communication 35'. As a result, a reliable fluid handling system can be provided in a microfluidic device. The traps can permit the use of larger deformable valves as any excess adhesion material displaced from such larger deformable valves can be moved out of the way and become trapped by the traps. The use of traps with deformable valves can permit the deformable valves to be made longer and wider.

FIG. 9 is a top-plan view of a microfluidic device region similar to the region B' shown in FIG. 4. FIG. 9 illustrates a deformable valve 221 and two traps 250 subsequent to an opening operation that involved deformation by an opening deformer that includes two opening blades. According to various embodiments, the opening deformer can include a blade including two opening tips, or single blade deformer that has struck twice, at different positions. Two fluid communications 235 can be seen extending between, and providing fluid communication between, two liquid-containment features 226. Displaceable adhesion material displaced during such an opening operation can be trapped in traps 250 to form displaced adhesion material 72, 74, 76, 78, 80, and 82 in the traps 250. In use, a liquid 85 can be transferred through one or both open fluid communications 235. Air 87 resulting from the liquid transfer can be located in either or both liquid-containment features 226. FIG. 9 shown an air bubble 89 surrounded by displaced adhesion material 82 in the trap 250, resulting from a double-strike opening operation.

FIG. 10 is a schematic view of the microfluidic device 100 shown in FIG. 9. As can be seen, one of the fluid communications 235 can provide a channel for an aqueous liquid to flow between the two liquid-containment features 226, for example, from left to right in FIG. 11. The other fluid communication 235 can provide a pathway for air or gas to flow, for example, from right to left, at the same time as the aqueous liquid flows in an opposite direction. The deformable valves 221 can be opened to include a plurality of fluid communications 235. The deformable valve 221 can provide one or more channels for displacing air or gases from one liquid-containment feature to a second feature as one or more other channels transfers a fluid from the second liquid-containment feature to the first. Including a second fluid pathway can be useful in increasing the flow rate of fluid transfer.

According to various embodiments, the use of traps with deformable valves can allow the use of relatively long intermediate walls of the deformable valves between liquid-containment features. Intermediate walls of longer length, for example, greater than about 0.2 mm, can enable the deformable valve to be closed more readily and reliably because of the larger area that is available for contact with one or more closing deformers. A longer intermediate wall can enable easier targeting by a closing deformer. Even if the substrate includes a relatively hard or brittle plastic, a longer deformable valve can reduce or eliminate fracturing or cracking of the substrate when the substrate is deformed by a closing deformer.

Figure 11:
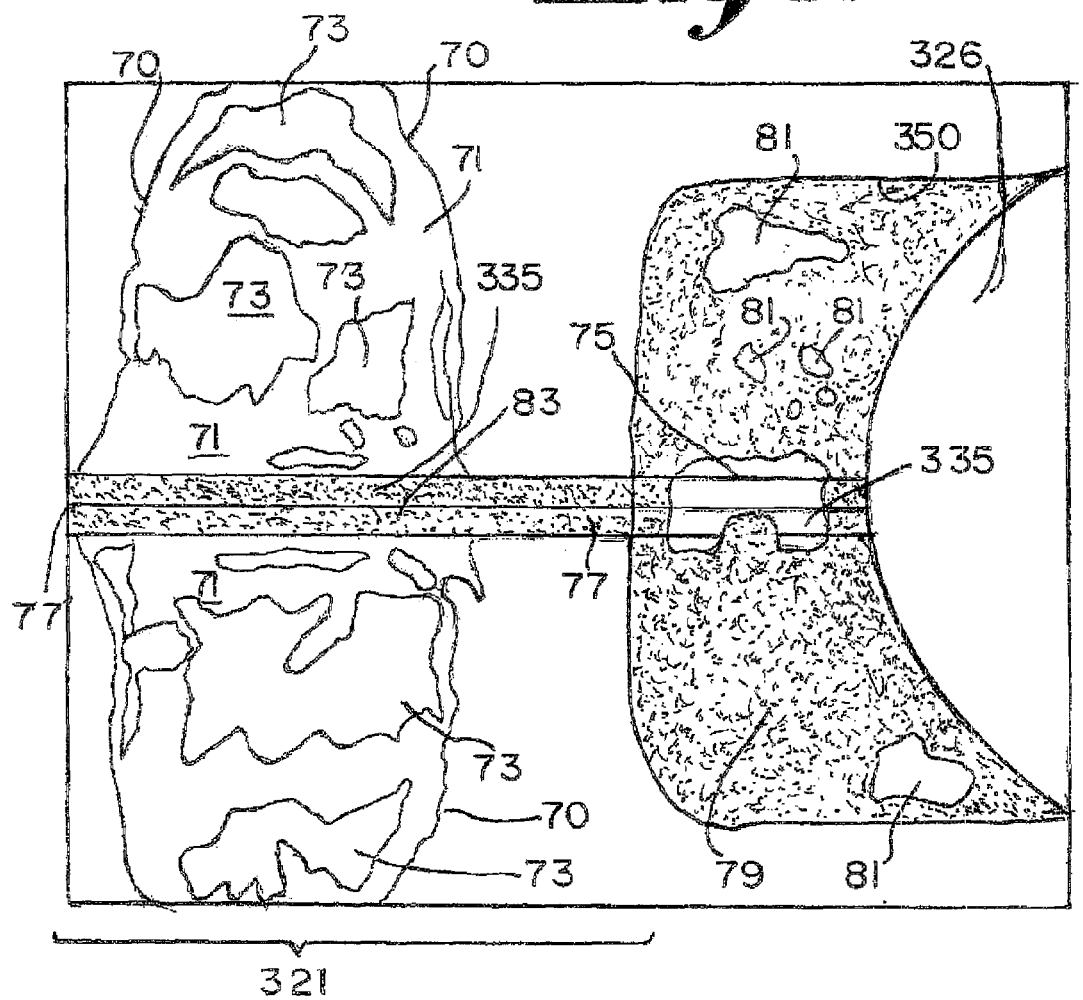
FIG. 11 is a top-plan view of region B' of FIG. 4, showing a fluid communication extending from a liquid-containment feature and a deformation formed by a closing deformer.

FIG. 11 is an enlarged view of a portion of a microfluidic device which is similar to region B' of FIG. 4, and shows a top plan view of a relatively long deformable valve 321 and a trap 350. The deformable valve 321 has been subjected to an opening operation followed by a closing operation. A fluid communication 335 that had extended from a liquid-containment feature 326 to another feature (not shown) has been closed, for example, with a closing deformer that made contact across the entire width of the fluid communication 335, thereby displacing a portion of displaceable adhesion material from adjacent the fluid communication 335 back into fluid communication. A deformation 70 formed by the closing deformer can extend across the fluid communication 335 as shown. Upon deformation with such a deformer, some of the displaceable adhesion material can be displaced back into the fluid communication 335 to form a closed portion 83. The closed portion 83 can block the fluid communication 335 and prevent a flow of liquid into and out of the liquid-containment feature 326.

As shown in FIG. 11, an adhesive-filled area 71 in the deformation 70 can result from the closing operation. Air bubbles 73 in deformation 70 can result from the closing operation. An air bubble 75 in an area including fluid communication 335, can result from the closing operation. An adhesive-filled portion 77 of the fluid communication 335 can result from a closing operation. Displaced adhesive material 79 can be disposed in trap 350 as a result of an opening and/or a closing operation. Air bubbles 81 can be formed in the trap 350. An adhesive filled closed portion 83 of the fluid communication 335 in the area of the deformation 70 can result from a closing operation.

Figure 12:
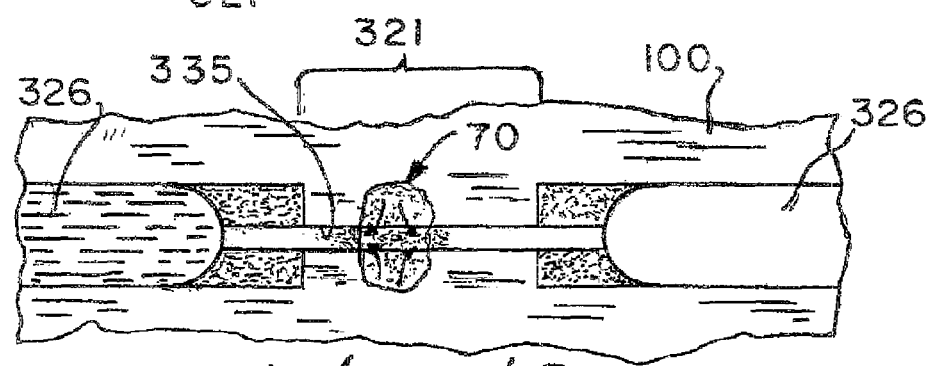
FIG. 12 is a schematic of the top-plan view shown in FIG. 11.

FIG. 12 schematically shows the entire deformable valve and trap arrangement shown in FIG. 11. The deformation 70 caused by a closing deformer striking the deformable valve 321 across the fluid communication 335 is shown, along with arrows indicating the direction of flow of the displaced adhesion material. The closing blade can hit perpendicular to an opened deformable valve 321, and can force adhesion material and substrate material into a part of the deformable valve 321 that was not hit by the closing deformer that formed tire deformation 70. The displaced adhesion material can operate to block the fluid communication between the two liquid-containment features 326.

Figure 13:
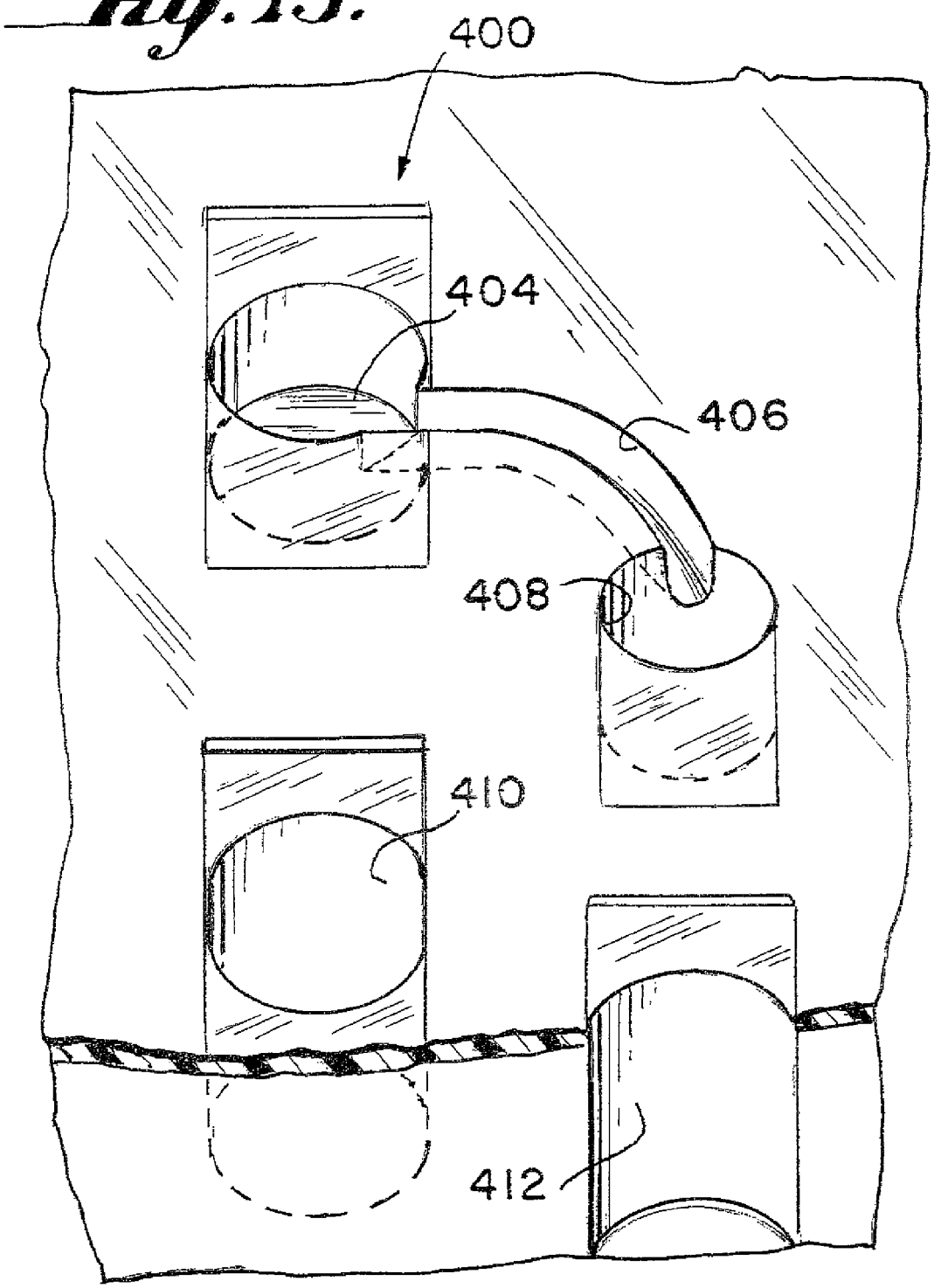
FIG. 13 is a perspective view in partial cross-section, of a section of a microfluidic device that includes a flow splitter.

FIG. 13 is a perspective view, in partial cross-section, of a section of a microfluidic device that includes a flow splitter 400. The flow splitter 400 can divide a liquid sample into two or more portions, for example, into two equal volumes. The flow splitter 400 can include an input liquid-containment feature 404 having a first depth. The liquid-containment feature 404 can be in fluid communication with a sample capture appendix 408 via an overflow channel 406. The fluid capture appendix 408 can have a second depth. The fluid capture appendix 408 can be located further from a central axis of rotation about which the microfluidic device can be spun, than the liquid-containment feature 404. According to various embodiments, the volume of the liquid-containment feature 404 can be from about 50% to about 150%, from about 80% to about 120%, or approximately equal to, the combined volume of the overflow channel 406 and the fluid capture appendix 408. The combined volume of the liquid-containment feature 404, the overflow channel 406, and the fluid capture appendix 408, can be at least sufficient to hold all of a sample transferred into liquid-containment feature 404 from an upstream liquid-containment feature, for example, from an upstream purification column or chamber. As such, the entirety of a sample disposed upstream of the liquid-containment feature 404 ca be transferred into the flow splitter 400.

According to various embodiments, a sample can be introduced into input liquid-containment feature 404 and split into two equal volumes. Valving methods, as described herein, can be used to introduce the sample into the liquid-containment feature 404. The overflow channel 406 can be connected to liquid-containment feature 404 such that when the sample enters the liquid-containment feature 404, for example, under the influence of centripetal force, the sample can first enter the overflow channel 406 and flow into the fluid capture appendix 408. The sample size can be designed to be equal to the combined volumes of the liquid-containment feature 404, the overflow channel 406, and the fluid capture appendix 408. The flow splitter 400 can split the sample into two sample portions of equal volume by first moving the portion of the sample retained in the liquid-containment feature 404 into the adjacent liquid-containment feature 410 by using appropriate valving as described herein.

According to various embodiments, the liquid-containment features 404 and 410 can be made to be in fluid communication by, for example, deforming the microfluidic device in an area between the two features at least once to create at least one fluid communication or passageway between the liquid-containment features 404 and 410. Using centripetal force, for example, half of the total volume of the sample can be transferred from liquid-containment feature 404 to liquid-containment feature 410. The other half of the total volume of the sample that remains in the overflow channel 406 and the fluid capture appendix 408 can subsequently or simultaneously be transferred to liquid-containment feature 412, for example, by deforming the microfluidic device in an area between feature 408 and 412, to form at least one fluid communication or passageway therebetween.

According to various embodiments, the first depth of the liquid-containment feature 404 can be equal to or different than the second depth of the fluid capture appendix 408. The depth of the overflow channel 406 can be about 10% to about 50% of at least one of the first and second depths. The depth of liquid-containment feature 410 can be equal to or different than the depth of liquid-containment feature 412. The depth of liquid-containment features 410 and 412 can be, for example, twice the depth of at least one of the first and second depths. The diameter of the liquid-containment feature 404 can be, for example, from about 0.6 mm to about 2.0 mm, or from about 0.9 mm to about 1.4 mm. The depth of the liquid-containment feature 404 can be, for example, from about 0.5 mm to about 1.5 mm, or from about 0.8 mm to about 1.0 mm. The width of the fluid connection channel can be, for example, from about 0.1 mm to about 0.6 mm, or from about 0.2 mm to about 0.4 mm. The depth of the overflow channel can be, for example, from about 0.1 mm to about 1.0 mm, or from about 0.4 mm to about 0.6 mm.

According to various embodiments, the liquid-containment features referred to herein can additionally or alternatively encompass fluid-containment features and solids-containment features.

FIG. 14 is a top-plan view of a flow distribution manifold 454 useful in a microfluidic device according to various embodiments. According to the exemplary embodiment shown, an input liquid-containment feature 452 can be fluidly connected to the flow distribution manifold 454. The input liquid-containment feature 452 can be arranged adjacent the flow distribution manifold 454, for example, as shown, or the two features can be spaced apart by, for example, from one mm to about 10 mm. The input liquid-containment feature 452 can be used for the introduction of one or more fluids, for example, a liquid sample, into the flow distribution manifold 454. The flow distribution manifold 454 can have a plurality of coves 460, 462, 464, 466, and 468 that are formed in a side of the flow distribution manifold 454 that is farthest from a central axis of rotation about which the microfluidic device can be spun in an exemplary operation. Each respective cove can be adjacent a respective adhesive material trap, for example, respective traps 470, 472, 474, 476, and 478 located spaced from the coves 460, 462, 464, 466, and 468. Fluid or sample contained in the coves 460, 462, 464, 466, and 468 can be transferred into respective processing pathways (not completely shown), for example, pathways that respectively include liquid-containment features 480, 482, 484, 486, and 488. The transfer can be accomplished by valving that can include deforming the substrate 450 of the microfluidic device to create at least one fluid communication or passageway between each of the coves and the respective liquid-containment features.

According to various embodiments, a closing deformer blade can be used alone, or in combination with one or more additional closing deformers. The closing deformer can form a barrier wall or dam of displaceable adhesion material across a fluid communication and close-off the fluid communication.

According to various embodiments, methods are provided that include at least one of an opening procedure and a closing procedure, as described herein. The opening and/or closing operation can be repeated one or more times. According to various embodiments, a closing method is provided wherein the deformable valve, or an area in the vicinity of the deformable valve, can be struck on either or both sides of a fluid communication traversing the valve. The valve can be closed by a strike within or across the width of the fluid communication. One or more closing blades can be used to strike the deformable valve, or an area in the vicinity of the deformable valve, in either a sequential or simultaneous manner, or in a combination of manners.

According to various embodiments, a thermal feature can provide heat or cold as desired to control the flow of the deformable adhesion material upon manipulation of the deformable valve. For example, a hot melt adhesive can be used as the displaceable adhesion material and the closing deformer can include a heat surface, for example, a heated compliant pad. A heated closing deformer can be made to remain in contact with a microfluidic device, as opposed to making a quick strike, to provide sufficient time for melting and reforming of the displaceable hot melt adhesion material. For example, a heated closing deformer can be made to remain in contact with the microfluidic device for at least about five seconds.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A microfluidic device comprising:
    a substrate having a first surface, an opposite second surface, and a thickness;
    an input liquid-containment feature formed in at least one of the first surface or the second surface, and having a first volume;
    an overflow channel having a second volume, and in fluid communication with the input liquid-containment feature; and
    a fluid capture appendix having a third volume and being in fluid communication with the overflow channel such that the fluid communication provides a dead-end fluid connection to the fluid capture appendix, the dead-end fluid connection provides the sole fluid access to the fluid capture appendix, and fluid cannot enter or exit the fluid capture appendix by any other way than through the dead-end fluid connection,
    wherein the combination of the second volume and the third volume is from about 80% to about 120% of the first volume.

2. The microfluidic device of claim 1, further comprising an input port, and a flow distribution manifold formed in the substrate and in fluid communication with the input port, the flow distribution manifold being arranged adjacent the input liquid-containment feature.

3. The microfluidic device of claim 1, wherein the combination of the second volume and the third volume is equal to the first volume.

* * * * *